United States Patent [19]
Black et al.

[11] 3,818,097

[45] June 18, 1974

[54] METHOD OF INHIBITING HISTAMINE ACTIVITY WITH ISOTHIOUREAS

[75] Inventors: James Whyte Black, Hemel Hempstead; Graham John Durant, Welwyn Garden City; John Colin Emmett, Codicote; Charon Robin Ganellin, Welwyn Garden City, all of England

[73] Assignee: Smith Kline & French Laboratories Limited, Welwyn Garden City, England

[22] Filed: Mar. 22, 1973

[21] Appl. No.: 343,741

Related U.S. Application Data

[63] Continuation-in-part of Ser. No. 80,818, Oct. 14, 1970, Pat. No. 3,759,944.

[30] Foreign Application Priority Data

Oct. 29, 1969 Great Britain .................... 52890/69

[52] U.S. Cl. ................. 424/273, 424/263, 424/269
[51] Int. Cl. ........................................... A61k 27/00
[58] Field of Search .................... 424/263, 273, 269

[56] References Cited

UNITED STATES PATENTS 3,558,640  1/1971  Shen et al. ......................... 260/309

*Primary Examiner*—Stanley L. Friedman
*Attorney, Agent, or Firm*—Joan S. Keps; Richard D. Foggio; William H. Edgerton

[57] ABSTRACT

A method of inhibiting histamine activity by administering S-(heterocyclic-alkyl) isothioureas.

9 Claims, No Drawings

METHOD OF INHIBITING HISTAMINE ACTIVITY WITH ISOTHIOUREAS

This application is a continuation-in-part of Ser. No. 80,818 filed Oct. 14, 1970 now U.S. Pat. No. 3,759,944.

This invention relates to a method of inhibiting histamine activity, and more particularly to a method of inhibiting H-2 histamine receptors, with isothioureas and their derivatives. Normally the compounds used in the methods of this invention exist as the addition salts but for convenience reference will be made throughout this specification to the parent compounds.

It has for long been postulated that many of the physiologically active substances within the animal body, in the course of their activity, combine with certain specific sites known as receptors. Histamine is a compound which is believed to act in such a way but, since the actions of histamine fall into more than one type, it is believed that there is more than one type of histamine receptor. The type of action of histamine which is blocked by drugs commonly called "antihistamines" (of which mepyramine is a typical example) is believed to involve a receptor which has been designated by Ash and Schild (Brit. J. Pharmac. Chemother. 27:427, 1966) as H-1. The isothiourea compounds used in the method of this invention are distinguished by the fact that they act at histamine receptors other than the H-1 receptor, that is they act at H-2 histamine receptors which are described by Black, et al., Nature 236,385 (1972). Thus they are of utility in inhibiting certain actions of histamine which are not inhibited by the above-mentioned "antihistamines." Inhibitors of H-2 histamine receptors are useful, for example, as inhibitors of gastric acid secretion and as anti-inflammatory agents, particularly where the inflammation is kinin-mediated.

The method of inhibiting H-2 histamine receptors according to this invention comprises administering to an animal in an amount sufficient to inhibit H-2 histamine receptors a compound of the formula:

FORMULA I

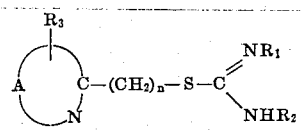

in which:
$n$ is 2 to 4;
A is a chain of three to four atoms of which one to two atoms are nitrogen and the remainder are carbon which forms an unsaturated ring with the carbon and nitrogen atoms to which it is attached;
$R_1$ is hydrogen or lower alkyl having one to three carbon atoms;
$R_2$ is hydrogen, lower alkyl having one to three carbon atoms, amino or benzyl or $R_1$ and $R_2$ together form an ethylene bridge and
$R_3$ is hydrogen, halo or benzyl,
or a pharmaceutically acceptable acid addition salt thereof.

The structure of the unsaturated ring in Formula I formed by A and the carbon and nitrogen atoms to which it is attached is such that the bond between the carbon and nitrogen atoms might equally well be represented as a double bond. Included among these rings are imidazole, 1,2,4-triazole, pyrazole and pyridine.

Preferably the unsaturated ring formed by A and the carbon and nitrogen atoms to which it is attached is imidazole and the alkylisothiourea side chain is most preferably attached thereto at the 4(5) position. $R_3$ is preferably hydrogen.

Compounds which are particularly useful in the method of this invention are N,N'-dimethyl-S-[2-(4(5)-imidazolyl)ethyl]-isothiourea and S-[4-(4(5)-imidazolyl)butyl]isothiourea.

Another object of this invention is a method of inhibiting gastric acid secretion which comprises administering internally to an animal in an amount sufficient to inhibit gastric acid secretion a compound of Formula I or a pharmaceutically acceptable acid addition salt thereof.

A process for the production of the compounds of Formula I comprises reacting omega substituted alkyl compounds of the following general Formula II

FORMULA II

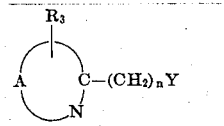

wherein Y is a suitable "leaving" group such as hydroxyl or a halogen and $n$, A and $R_3$ have the same significance as in Formula I, with a thiourea of the formula

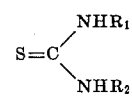

wherein $R_1$ and $R_2$ have the same significance as in Formula I.

In the case where Y is a halogen the reaction may be carried out in a suitable solvent, for example in ethanol, and in the case where Y is hydroxyl then the reaction may be carried out in an aqueous solution of a strong acid such as hydrogen bromide. This reaction of course normally results in the production of the corresponding strong acid salt, for example with hydrogen bromide or hydrogen chloride. The free base may be readily obtained from this salt by methods known in the art, for example by ion-exchange chromatography, which method may also be used for the conversion of one salt to another. Also, one salt may be converted to another by double decomposition which is well known to the art.

A method which may be used for the production of certain compounds of Formula II wherein Y is hydroxyl involves the reduction with lithium aluminum hydride in a suitable solvent such as ether or tetrahydrofuran of the corresponding substance of Formula II wherein $n$ is one unit less and Y is carbethoxy.

The compounds of Formula I may be combined with a pharmaceutically acceptable carrier to form pharmaceutical compositions. Pharmaceutical compositions comprising the substance S-[2-(4(5)-imidazolyl)ethyl- ]isothiourea are amongst those which are most preferred. Advantageously the composition will be made up in dosage unit form appropriate to the desired mode of administration. The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. The acid addition salts of Formula I are generally water soluble. Other pharmacologically active compounds may in certain cases be included in the pharmaceutical compositions.

As stated above, the isothioureas of the method of the present invention have been found to have pharmacological activity in the animal body as antagonists to certain actions of histamine which are not blocked by "antihistamines" such as mepyramine. For example, they have been found to inhibit selectively the histamine-stimulated secretion of gastric acid from the lumen-perfused stomachs of rats anaesthetized with urethane, at doses from 8 to 256 micromoles per kilogram, given intravenously. Similarly, the action of these compounds may, in many cases, be demonstrated by their antagonism to the effects of histamine on other tissues which, according to the above-mentioned paper of Ash and Schild, are not H-1 receptors. Examples of such tissues are perfused isolated guinea-pig heart, isolated guinea-pig right atrium and isolated rat uterus.

The compounds of the method of this invention inhibit the secretion of gastric acid stimulated by pentagastrin or by food. In addition, these compounds also show anti-inflammatory activity in conventional tests such as the rat paw oedema test and u.v. erythema test. In the rat paw oedema test where the oedema is induced by bradykinin the paw volume is reduced by subcutaneous injections of doses of about 500 micromoles/kg. The level of activity found for the compounds used in the method of the present invention is illustrated by the effective dose range in the anaesthetized rat, that is from 8 to 256 micromoles per kilogram, given intravenously, and also by the dose effective in the rat paw oedema test.

A wide variety of pharmaceutical forms can be employed. Thus, if a solid carrier is used, the preparation can be tableted, placed in a hard gelatin capsule in powder or pellet form, or in the form of a troche or lozenge. The amount of solid carrier will vary widely but preferably will be from about 25 mg. to about 1 gm. If a liquid carrier is used, the preparation may be in the form of a syrup, emulsion, soft gelatin capsule, sterile injectable liquid such as an ampoule, or an aqueous or nonaqueous liquid suspension.

The pharmaceutical compositions are prepared by conventional techniques involving procedures such as mixing, granulating and compressing or dissolving the ingredients as appropriate to the desired preparation.

The active ingredient will be present in the composition in an effective amount to inhibit H-2 histamine receptors. The route of administration may be internally, i.e., orally or parenterally, or topically.

Preferably, each dosage unit for internal administration will contain the active ingredient in an amount of from about 100 mg. to about 250 mg. The active ingredient will preferably be administered in equal doses three to six times per day. The daily dosage regimen for internal administration will preferably be from about 750 mg. to about 1,000 mg.

For therapeutic use, the pharmacologically active compounds of the method of the present invention will normally be administered as a pharmaceutical composition comprising as the or an essential active ingredient at least one such compound in the basic form or in the form of an addition salt with a pharmaceutically acceptable acid and in association with a pharmaceutical carrier therefor. Such addition salts include those with hydrochloric, hydrobromic, hydriodic, sulphuric, picric and maleic acids.

Advantageously the composition will be made up in a dosage form appropriate to the desired mode of administration, for example as a tablet, capsule, injectable solution or, when used as an anti-inflammatory agent, as a cream for topical administration.

The invention is illustrated but in no way limited by the following examples.

EXAMPLE 1

Preparation of S-[2-(4(5)-imidazolyl)ethyl]isothiourea dihydrobromide

A solution of 4(5)-(2-hydroxyethyl)imidazole (6.0 g.) and thiourea (4.1 g.) in 48 percent aqueous hydrobromic acid (37 ml.) is heated under reflux for 17 hours. Following evaporation to dryness, the solid residue is recrystallized from isopropyl alcohol-ethanol-ether, yielding S-[2-(4(5)-imidazolyl)ethyl]-isothiourea dihydrobromide, m.p. 208°–212°C. Recrystallization from the same solvents yields pure product, m.p. 210°–212°C.

EXAMPLE 2

Preparation of S-[2-(4(5)-imidazolyl)ethyl]isothiourea dihydrochloride

A solution of 4(5)-(2-chloroethyl)imidazole hydrochloride (6.6 g.) and thiourea (3 g.) in ethanol (98 percent, 50 ml.) is heated under reflux for 3 hours, treated with charcoal and filtered. Addition of ethyl acetate gives the product, m.p. 205.5°–207°C. Additional material (m.p. 203°–207°C.) is obtained from the mother liquors. Recrystallization from ethanol gives pure dihydrochloride, m.p. 205.5°–207°C.

EXAMPLE 3

Preparation of N,N'-dimethyl-S-[2-(4(5)-imidazolyl)ethyl]-isothiourea dihydrobromide A mixture of 4(5)-(2-hydroxyethyl)imidazole (2.24 g.), N,N'-dimethylthiourea (2.04 g.) and 48 percent aqueous hydrobromic acid (12 ml.) is caused to react in a manner similar to that described in Example 1. The pure product, m.p. 203°–204°C., is obtained by recrystallization from absolute alcohol.

EXAMPLE 4

Preparation of N-methyl-S-[2-(4(5)-imidazolyl)ethyl]isothiourea dihydrobromide

A mixture of 4(5)-(2-hydroxyethyl)imidazole (2.24 g.), N-methylthiourea (1.80 g.) and 48 percent aqueous hydrobromic acid (10 ml.) is caused to react in a manner similar to that described in Example 1. The pure product, m.p. 180°–181°C., is obtained by recrystallization from methanol-ethanol-isopropyl alcohol.

EXAMPLE 5

Preparation of N,N'-diethyl-S-[2-(4(5)-imidazolyl)ethyl]isothiourea dinitrate

A mixture of 4(5)-(2-hydroxyethyl)imidazole (3.36 g.), N,N'-diethylthiourea (3.97 g.) and 48 percent aqueous hydrobromic acid (18 ml.) is caused to react in a manner similar to that described in Example 1. The product from the reaction is converted into a nitrate salt by treatment with aqueous silver nitrate. Recrystallization from ethanol-ethyl acetate yields N,N'-diethyl-S-[2-(4(5)-imidazolyl)ethyl]isothiourea dinitrate, m.p. 96°–97°C.

EXAMPLE 6

Preparation of S-[2-(4(5)-imidazolyl)ethyl]isothiosemicarbazide dihydrobromide

A solution of 4(5)-(2-hydroxyethyl)imidazole (20 g.) in 49 percent aqueous hydrobromic acid (300 ml.) is heated under reflux for 48 hours. Concentration, followed by recrystallization from ethanol-ether affords 4(5)-(2-bromoethyl)imidazole hydrobromide, m.p. 149°–150°C.

A solution of 4(5)-(2-bromoethyl)imidazole hydrobromide (10.0 g.) and thiosemicarbazide (3.6 g.) in ethanol (170 ml.) is heated under reflux for 24 hours. Concentration and cooling gives S-[2-(4(5)-imidazolyl)ethyl]isothiosemicarbazide dihydrobromide, m.p. 170°–173°C.

EXAMPLE 7

Preparation of S-[4-(4(5)-imidazolyl)butyl]isothiourea dihydrobromide

4-[4(5)-Imidazolyl] butyric acid hydrochloride (72.0 g.) is esterified using a solution of gaseous hydrogen chloride in ethanol (14.5 percent). The solution is heated under reflux for 18 hours in the presence of a molecular sieve contained in a Soxhlet apparatus. Concentration affords the ethyl ester hydrochloride (78.2 g.) which is converted into the base by dissolving in absolute alcohol (200 ml.) and neutralizing with a solution prepared from sodium (7.93 g.) in alcohol (250 ml.). Following removal of inorganic material the crude ester base (54.7 g.) is isolated and used without further purification. This ester is dissolved in anhydrous tetrahydrofuran (700 ml.) and added slowly to a stirred suspension of lithium aluminum hydride (46.6 g.) in anhydrous tetrahydrofuran (220 ml.). Stirring is continued at room temperature for 17 hours, whereupon water (84 ml.) is slowly added, followed by the application of moderate heat for 15 minutes. The solid present is removed by filtration and extracted three times with hot tetrahydrofuran. The combined extracts are evaporated, affording 4(5)-(4-hydroxybutyl)imidazole (23 g.), a sample of which is converted into an oxalate salt, m.p. 104°–106°C.

A mixture of 4(5)-(4-hydroxybutyl)imidazole (2.24 g.), thiourea (1.22 g.) and 48 percent aqueous hydrobromic acid (10 ml.) is caused to react in a manner similar to that described in Example 1. The initial product obtained (m.p. 110°–115°C.) is recrystallized from methanol-nitromethane-ethyl acetate affording S-[4-(4(5)-imidazolyl)butyl]isothiourea dihydrobromide in three crops: 1.1 g. m.p. 113°–114°C.; 0.4 g. m.p. 109°–113°C.; 0.6 g. m.p. 110°–112°C.

EXAMPLE 8

Preparation of S-[3-(1-benzyl-2-imidazolyl)propyl]isothiourea dihydrochloride

A solution of 1-benzyl-2-(2-carbethoxyethyl)imidazole (5.2 g.) in dry ether (150 ml.) is added, dropwise, to a stirred suspension of aluminium lithium hydride (1.0 g.) in dry ether (150 ml.) at gentle reflux. The suspension is subsequently heated under reflux for 2 hours, and then cooled during the successive addition of water (1 ml.), 15 percent sodium hydroxide (1 ml.) and water (3 ml.). After heating under reflux for 0.5 hour and filtration, the insoluble solid is extracted with hot methanol (3 × 100 ml.). The combined organic extracts are concentrated under reduced pressure and the residue dissolved in 2N hydrochloric acid. Following extraction with chloroform, the solution is basified with solid potassium carbonate. Chloroform extracts of the basic solution are dried over sodium sulphate and concentrated under reduced pressure, affording 1-benzyl-2-(3-hydroxypropyl)imidazole as a colorless viscous liquid (4.6 g.). The carbinol (4.4 g.) is dissolved in benzene (40 ml.) and added to thionyl chloride (20 ml.) at reflux temperature. After complete addition, water (four drops) is added and the mixture is heated under reflux for 0.5 hour. Concentration followed by the addition of cyclohexane yields a yellow solid. Recrystallization from ethanol-ether yields 1-benzyl-2-(3-chloropropyl)imidazole hydrochloride, m.p. 162°–164°C.

A solution of 1-benzyl-2-(3-chloropropyl)imidazole hydrochloride (2.7 g.) and thiourea (0.76 g.) in absolute ethanol (25 ml.) is heated under reflux for 18 hours. Concentration followed by recrystallization from ethanol-ether affords S-[3-(1-benzyl-2-imidazolyl)propyl]isothiourea dihydrochloride as the monohydrate, m.p. 121°–123°C.

EXAMPLE 9

Preparation of S-[2-(3-(1,2,4-triazolyl)ethyl)]isothiourea dihydrobromide

A mixture of 3-(2-ethoxyethyl)-1,2,4-triazole (4.5 g.) and 48 percent aqueous hydrobromic acid (75 ml.) is heated under reflux for 24 hours. Following concentration under reduced pressure, the residue is dissolved in 48 percent aqueous hydrobromic acid (65 ml.). Thiourea (2.15 g.) is added and the resultant solution heated under reflux for 24 hours. The residue obtained following concentration is extracted with ethanol. The extracts are concentrated and triturated with isopropyl alcohol. The solid obtained is recrystallized from ethanol-isopropyl alcohol affording S-[2-(3-(1,2,4-triazolyl)ethyl)]isothiourea dihydrobromide, m.p. 169°–171°C. Additional product of slightly lower melting point is obtained from the mother liquors.

EXAMPLE 10

Preparation of S-[2-(2-pyridyl)ethyl]isothiourea dihydrobromide

A mixture of 2-(2-hydroxyethyl)pyridine (20.0 g.), thiourea (12.5 g.) and 48 percent aqueous hydrobromic acid (90 ml.) is caused to react in a manner similar to that described in Example 1. Recrystallization from methanol-isopropyl alcohol affords S-[2-(2-pyridyl)ethyl]isothiourea dihydrobromide, m.p. 229°–230°C.

EXAMPLE 11

Preparation of S-[3-(4(5)-imidazolyl)propyl]isothiourea dihydrobromide

A mixture of 4(5)-(3-hydroxypropyl)imidazole (2.52 g.), thiourea (1.52 g.) and 48 percent aqueous hydrobromic acid (14 ml.) is caused to react in a manner similar to that described in Example 1. Recrystallization from methanol-isopropyl alcohol affords S-[3-(4(5)-imidazolyl)propyl]isothiourea dihydrobromide, m.p. 235°–238°C. (dec.).

EXAMPLE 12

Preparation of 2-[(4(5)-imidazolyl)ethyl]thio-2-imidazoline dihydrobromide

A solution of 4(5)-(2-bromoethyl)imidazole hydrobromide (2.56 g.) and 2-mercapto-2-imidazoline (1.02 g.) in ethanol is heated under reflux for 24 hours. Concentration, followed by recrystallization from ethanol, gives 2-[(4(5)-imidazolyl)ethyl]-thio-2-imidazoline dihydrobromide, m.p. 227°–229°C.

EXAMPLE 13

Preparation of N-benzyl-S-[2-(4(5)-imidazolyl)ethyl]isothiourea dihydrobromide

A solution of 4(5)-(2-bromoethyl)imidazole hydrobromide (5.0 g.) and N-benzylthiourea (3.25 g.) in ethanol is heated under reflux for 24 hours. Concentration followed by repeated recrystallization from isopropyl alcohol-ether gives N-benzyl-S-[2-(4(5)-imidazolyl)ethyl]isothiourea dihydrobromide, m.p. 158°–168°C.

EXAMPLE 14

Preparation of S-[2-(3-pyrazolyl)ethyl]isothiourea dihydrobromide 4-(2-Tetrahydropyranyloxy)but-1-yne (50.0 g.) is added slowly (45 minutes) to a solution prepared from magnesium (9.3 g.) and ethyl bromide (45.5 g.) in ether (200 ml.), with stirring and concomitant distillation of ether. Dry benzene (150 ml.) is then added and the mixture is set aside for 2 hours with occasional agitation. Ethyl orthoformate (57.8 g.) is added in one portion and the mixture is heated under reflux for 20 hours. Following addition to ether (300 ml.) and ice-water (200 ml.) containing ammonium acetate (10 g.) the whole is filtered. The organic layer is separated, washed with saturated sodium carbonate solution (3 × 100 ml.) dried over sodium sulphate, concentrated and distilled, giving 2-(5,5-diethoxypent-3-ynyl)oxytetrahydropyrane, b.p. 124°–128°C./0.65 mm.

2-(5,5-Diethoxypent-3-ynyl)oxytetrahydropyrane (30.0 g.) is added slowly (20 minutes) to a solution of hydrazine hydrochloride (13.7 g.) in 50 percent aqueous ethanol (134 ml.) The temperature is maintained at below 45°C. during the addition, and the mixture is subsequently set aside at room temperature for 18 hours. Following the addition of sodium carbonate (10 g.), the reaction mixture is concentrated under reduced pressure. The residue is extracted with ethanol and the combined extracts are concentrated and distilled, giving 3-(2-hydroxyethyl)pyrazole (5.0 g.), b.p. 162°–164°C./0.3–0.4 mm. The picrate has m.p. 137.5°–138.5°C. (from ethanol).

A solution of 3-(2-hydroxyethyl)pyrazole (5.0 g.) and thiourea (3.4 g.) in 48 percent hydrobromic acid (60 ml.) is heated under reflux for 20 hours. Following concentration, the product is ultimately recrystallized from ethanol-water to give S-[2-(3-pyrazolyl)ethyl]isothiourea dihydrobromide, m.p. 194°–196°C.

EXAMPLE 15

Preparation of S-[2-(4(5)-bromo-5(4)-imidazolyl)ethyl]isothiourea dihydrochloride Silver sulphate (15.7 g.) and then bromine (5.4 ml.) are added to a solution of 4(5)-(2-chloroethyl)imidazole hydrochloride (8.4 g.) in concentrated sulphuric acid. The mixture is shaken continuously in the absence of light for 4 days and then filtered. The filtrate is added to water (2 l.), basified (pH 9-10) with anhydrous sodium carbonate and concentrated. Methanol extracts of the residue are acidified with anhydrous hydrogen chloride. Following concentration and extraction of the residue with ethanol and further concentration, the residue is extracted with acetone. These extracts are treated with charcoal, concentrated (approximately 300 ml.) and diluted with ethyl acetate. The solid (2.9 g., m.p. 154°C.) obtained is dissolved in ethanol (500 ml.) containing thiourea (0.76 g.) and heated under reflux for 18 hours. The product is converted into the picrate (1.62 g., m.p. 194°–196°C.), which, following treatment with hydrochloric acid in the usual way, affords S-[2-(4(5)-bromo-5(4)-imidazolyl)ethyl]isothiourea dihydrochloride, m.p. 198°–199°C. (from ethanol-ethyl acetate).

EXAMPLE 16

Preparation of N,N'-dipropyl-S-[2-(4(5)-imidazolyl)ethyl]isothiourea dihydrobromide Reacting 4(5)-(2-hydroxyethyl)imidazole, N,N'-dipropyl-thiourea and 48 percent aqueous hydrobromic acid in a manner similar to that described in Example 1 gives the product.

EXAMPLE 17

| Ingredients | Amounts |
| --- | --- |
| N,N'-dimethyl-S-[2-(4(5)-imidazolyl)ethyl]isothiourea dihydrobromide | 150 mg. |
| Sucrose | 75 mg. |
| Starch | 25 mg. |
| Talc | 5 mg. |
| Stearic acid | 2 mg. |

The ingredients are screened, mixed and filled into a hard gelatin capsule.

EXAMPLE 18

| Ingredients | Amounts |
| --- | --- |
| S-[4-(4(5)-imidazolyl)butyl]isothiourea dihydrobromide | 200 mg. |
| Lactose | 100 mg. |

The ingredients are screened, mixed and filled into a hard gelatin capsule.

The capsules prepared as in Examples 17 and 18 are administered orally to a subject having excessive gastric acid secretion within the dose ranges given hereabove.

What is claimed is:

1. A method of inhibiting H-2 histamine receptors which comprises administering to an animal in an amount sufficient to inhibit H-2 histamine receptors a compound of the formula:

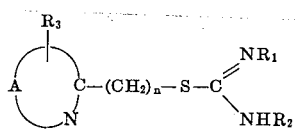

in which:
*n* is 2 to 4;
A taken together with the carbon and nitrogen atoms shown forms an imidazolyl, 1,2,4-triazolyl, pyrazolyl or pyridyl ring;
$R_1$ is hydrogen or lower alkyl having one to three carbon atoms;
$R_2$ is hydrogen, lower alkyl having one to three carbon atoms, amino or benzyl or $R_1$ and $R_2$ together form an ethylene bridge and
$R_3$ is hydrogen, halo or benzyl, or a pharmaceutically acceptable acid addition salt thereof.

2. A method according to claim 1 in which A taken together with the carbon and nitrogen atoms shown forms an imidazolyl ring.

3. A method according to claim 1 in which $R_3$ is hydrogen.

4. A method according to claim 1 in which the compound is the dihydrobromide or dihydrochloride salt of S-[2-(4(5)-imidazolyl)ethyl]isothiourea.

5. A method according to claim 1 in which the compound is N,N'-dimethyl-S-[2-(4(5)-imidazolyl)ethyl]isothiourea dihydrobromide.

6. A method according to claim 1 in which the compound is S-[4-(4(5)-imidazolyl)butyl]isothiourea dihydrobromide.

7. A method of inhibiting gastric acid secretion which comprises administering internally to an animal in an amount sufficient to inhibit gastric acid secretion a compound of the formula:

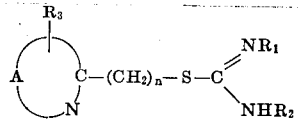

in which:
*n* is 2 to 4;
A taken together with the carbon and nitrogen atoms shown forms an imidazolyl, 1,2,4-triazolyl, pyrazolyl or pyridyl ring;
$R_1$ is hydrogen or lower alkyl having one to three carbon atoms;
$R_2$ is hydrogen, lower alkyl having one to three carbon atoms, amino or benzyl or $R_1$ and $R_2$ together form an ethylene bridge and
$R_3$ is hydrogen, halo or benzyl, or a pharmaceutically acceptable acid addition salt thereof.

8. A method according to claim 7 in which the compound is the dihydrobromide or dihydrochloride salt of S-[2-(4(5)-imidazolyl)ethyl]isothiourea.

9. A method according to claim 7 in which A taken together with the carbon and nitrogen atoms shown forms an imidazolyl ring.

* * * * *